United States Patent
Lee et al.

(10) Patent No.: US 7,630,135 B2
(45) Date of Patent: Dec. 8, 2009

(54) TWO-DIMENSIONAL BLAZED MEMS GRANTING

(75) Inventors: Benjamin L. Lee, Dallas, TX (US); Claude E. Tew, Dallas, TX (US); Walter M. Duncan, Dallas, TX (US)

(73) Assignee: Texas Instrument Incorporated, Dallas, TX (US)

( * ) Notice: Subject to any disclaimer, the term of this patent is extended or adjusted under 35 U.S.C. 154(b) by 0 days.

(21) Appl. No.: 11/224,336

(22) Filed: Sep. 12, 2005

(65) Prior Publication Data

US 2006/0007546 A1    Jan. 12, 2006

Related U.S. Application Data

(62) Division of application No. 09/923,911, filed on Aug. 7, 2001, now Pat. No. 6,943,950.

(60) Provisional application No. 60/223,366, filed on Aug. 7, 2000.

(51) Int. Cl.
  *G02B 5/18* (2006.01)
  *H04J 14/02* (2006.01)
(52) U.S. Cl. .................... 359/573; 359/571; 398/84; 398/87
(58) Field of Classification Search ............. 359/573, 359/223, 224, 290, 291, 571; 398/84, 87
  See application file for complete search history.

(56) References Cited

U.S. PATENT DOCUMENTS

| 4,736,132 | A | * | 4/1988 | Culp ........................ 310/333 |
| 5,311,360 | A |   | 5/1994 | Bloom et al. |
| 5,943,157 | A | * | 8/1999 | Florence et al. ............. 359/290 |
| 6,028,689 | A | * | 2/2000 | Michalicek et al. ......... 359/224 |
| 6,097,859 | A | * | 8/2000 | Solgaard et al. ............. 385/17 |
| 6,434,291 | B1 |  | 8/2002 | Kessler et al. |
| 6,618,187 | B2 |  | 9/2003 | Pilossof |
| 6,618,520 | B2 |  | 9/2003 | Tew |
| 6,633,694 | B2 |  | 10/2003 | Tew |
| 6,816,640 | B2 |  | 11/2004 | Tew |

OTHER PUBLICATIONS

Derickson, D. Fiber Optic Test and Measurement. NJ, Prentice-Hall, 1998. p. 7.*
Coomber, Stuart et al., "Optically Addressed Spatial Light Modulators for Replaying Computer Generated Holograms," Proceedings of SPIE, vol. 4457, 2001, pp. 9-19.

* cited by examiner

*Primary Examiner*—Alessandro Amari
(74) *Attorney, Agent, or Firm*—Charles A. Brill; Wade James Brady, III; Frederick J. Telecky, Jr.

(57) ABSTRACT

A method for assuring a blazed condition in a DMD device used in telecommunications applications. By meeting certain conditions in the fabrication and operation of the DMD, the device can achieve a blazed condition and be very effective in switching near monochromatic spatially coherent light, thereby opening up a whole new application field for such devices. This method determines the optimal pixel pitch and mirror tilt angle for a given incident angle and wavelength of near monochromatic spatially coherent light to assure blazed operating conditions. The Fraunhofer envelope is determined by convolving the Fourier transforms of the mirror aperture and the delta function at the center of each mirror and then aligning the center of this envelope with a diffraction order to provide a blazed condition. The method of the present invention presents a formula for precisely determining the mirror pitch and tilt angle to assure that a blazed condition exists for a given incident angle and wavelength of near monochromatic spatially coherent light. Considerations for the special case, know as Littrow conditions, where the incident and the reflected light transverse the same path, are also given. This case is particularly attractive for fiber optic/telecommunication applications since the same optics can be used for incoming and outgoing (reflected) light.

12 Claims, 8 Drawing Sheets

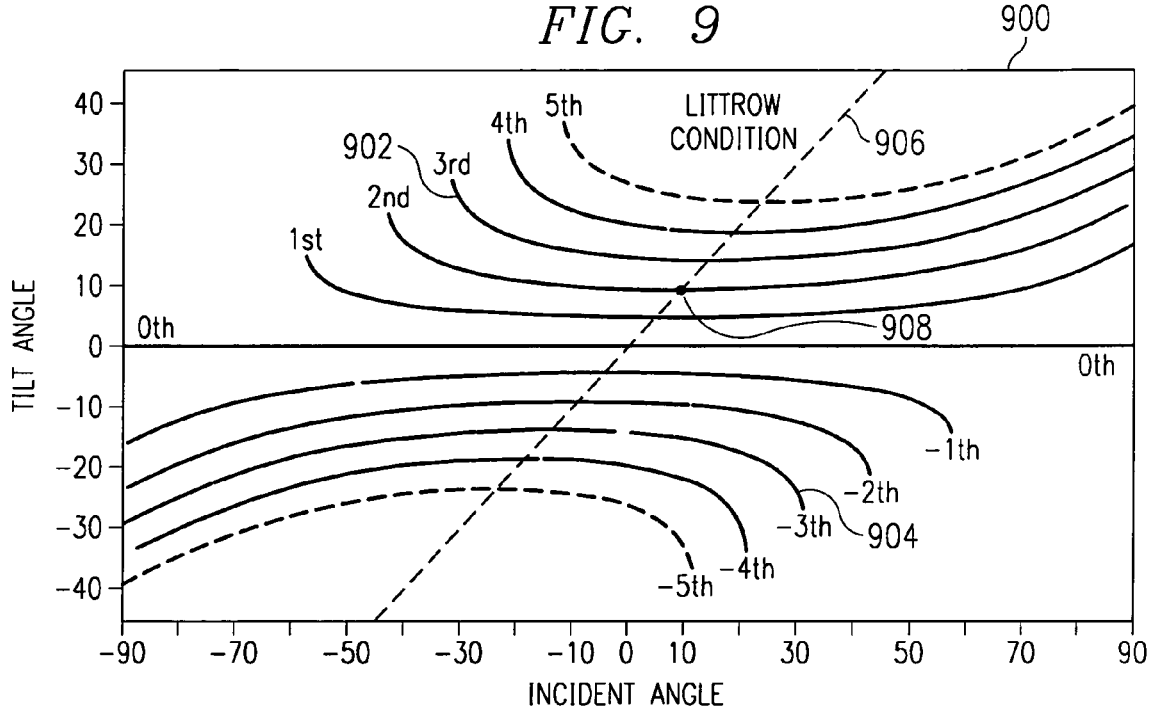
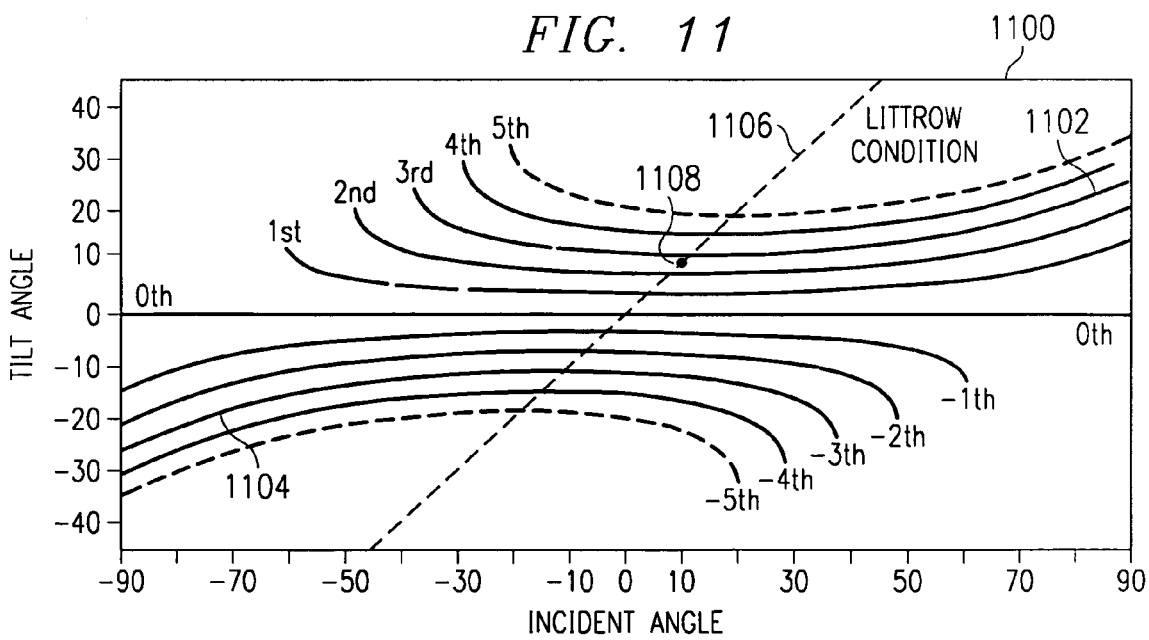

TWO-DIMENSIONAL BLAZED MEMS GRANTING

This application is a Divisional of application Ser. No. 09/923,911, filed Aug. 7, 2001 now U.S. Pat. No. 6,943,950, which claims benefit of Provisional Application No. 60/223,366, filed Aug. 7, 2000.

FIELD OF THE INVENTION

The present invention relates to telecommunications switching apparatus and more particular to the use of two-dimensional blazed MEMS devices in such applications.

BACKGROUND OF THE INVENTION

Micromirror devices are micro-machined micro-electro-mechanical systems (MEMS), also known as micro-opto-electro-mechanical system (MOEMS). A typical micromirror device, or digital micromirror device (DMD) is comprises several hundred thousand mirrors, each approximately 16 μm square on a 17 μm grid. Each mirror is selectively able to rotate approximately 10 degrees in either a positive or negative direction about a torsion hinge.

DMDs are widely used in display applications. In display applications, each mirror is used to control light destined for one pixel of a projected image. Since DMDs typically operate in either a full-on state, in which incident light is directed towards a display screen, or in a full-off state, in which incident light is directed away from the display screen, pulse width modulation is necessary to create gray scale images.

While DMDs have saturated the display market, they have not made inroads into non-display markets such as optical communication. Since a large number of mirrors typically is not necessary in optical communication markets, MEMS devices used in optical communications typically use a single relatively large mirror. Inefficiencies have thus far prevented DMDs from gaining acceptance in the optical communications markets. What is needed is a DMD design and method of operation that improves efficiency of the micromirror array in optical communications markets.

SUMMARY OF THE INVENTION

The present invention discloses a MEMS device and method for satisfying the blazed condition for use in telecommunications applications. By meeting certain conditions in the fabrication and operation of the DMD, the device can achieve a blazed condition and be very efficient in switching near monochromatic spatially coherent light, thereby opening up a whole new application field for such devices.

By determining the optimal pixel pitch, determined by mirror size, and mirror tilt angle for a given incident angle and wavelength of near monochromatic spatially coherent light, the device can be operated in the blazed state. The required mirror size and tilt angle is well within the fabrication process requirements for a DMD device, but these two parameters must be precisely determined to provide blazed operation, otherwise the light will be shared among a number of diffraction orders such that no single order has a sufficient return signal to be useful.

By considering the DMD as a two-dimensional array of micromirrors and performing a Fourier transform on the convolution of both the mirror aperture function and an array of delta functions representing the center of each mirror in the array, the diffraction orders that determine where light will be available and the Fraunhofer envelope, which represents the relative amount of energy available to these diffraction orders reflected off the array, is determined. Then by imposing the condition that the center of the Fraunhofer envelope be aligned with a diffraction order, a blazed condition can be met. The method of the present invention presents a formula for precisely determining the mirror pitch and tilt angle to assure that such a blazed condition exists for a given incident angle and wavelength of near monochromatic spatially coherent light.

The present invention further considers the blazed condition requirements for the special case, know as Littrow condition, where the incident and the reflected light transverses the same path. This case is particularly attractive for fiber optics and telecommunication applications since the same optics can be used for incoming (incident) and outgoing (reflected) light. In practice, the incident and reflected light need not transverse the same path, but the paths must merely be close enough together to allow the reuse of the optics. For the purposes of this disclosure and the appended claims, discussion of the Littrow condition and coincident light paths is intended to encompass all embodiments in which the incident and reflected light paths are close enough to share the same optics.

One embodiment of the present invention provides a method for efficient operation of a two-dimensional MEMS grating. The method comprises: selecting a wavelength ($\lambda$) of near monochromatic spatially coherent light; determining a grating pitch, an angle of incidence, a tilt angle, and a diffraction order to satisfy:

$$\theta_t(\theta_i, n) = \tfrac{1}{2}\{arc\sin[(n\lambda/d)\sqrt{2} - \sin(\theta_i)] + \theta_i\}$$

where:
$\theta_t$ is a tilt angle relative to the MEMS grating normal,
$\theta_i$ is an angle of incidence relative to the MEMS grating normal,
n is a diffraction order,
$\lambda$ is a wavelength of incident near monochromatic spatially coherent light, and
d is a pixel grating pitch of the MEMS grating.

Another embodiment of the present invention provides a micromirror device comprising: a two-dimensional array of deflectable mirrors. The array having a pitch distance (d) between adjacent mirrors; a deflectable member supporting each mirror, the deflectable member establishing a tilt angle for each its corresponding mirror. The micromirror device blazed for near monochromatic spatially coherent light having a wavelength in the range of 1480-1580 nm.

Another embodiment of the present invention provides a system for fiber optic/telecommunication switching/modulating applications, comprising: an optical grating; one or more near monochromatic spatially coherent light input signals coupled to the optical grating. The optical grating converting the light into collimated channels of varying frequency. The collimated light being passed through condensing optics on to the surface of a micromirror device. The micromirror device comprising: a two-dimensional array of deflectable mirrors, the array having a pitch distance (d) between adjacent mirrors and a deflectable member supporting each mirror. The deflectable member establishing a tilt angle for its corresponding mirror. Wherein the micromirror device is blazed for near monochromatic spatially coherent light having a wavelength in the range of 1480-1580 nm.

Another embodiment of the present invention provides a method for achieving a blazed condition in a two-dimensional MEMS grating device, comprising the alignment of the Fraunhofer envelope center, determined by the pixel pitch and tilt angle of said MEMS device, with an optical diffraction order, further comprising the steps of: for a given near monochromatic spatially coherent light at a given incident angle, $\theta_i$, determining the angle for the $n^{th}$ diffraction order of said light as:

$$\sin(\theta_n)=\sin(-\theta_i)+n\lambda/d$$

where:
$\theta_n$ is the angle of the $n^{th}$ diffraction order,
n is the diffraction order,
$\lambda$ is the wavelength of said incident light, and
d is the pixel grating pitch of said MEMS device;
satisfying the blaze condition that:

$$\sin(\theta_n)=\sin(\theta_F)$$

where:
$\theta_F$ is the angle for the Fraunhofer envelope, to align the center of the Fraunhofer envelope center with diffraction order n, and further:

$$\theta_F=-\theta_i+2\theta_t$$

where $\theta_t$ is the tilt angle of the individual grating mirrors; and
satisfying the condition:

$$\theta_t(\theta_i, n)=\tfrac{1}{2}\{arc\sin[(n\lambda/d)\sqrt{2}-\sin(\theta_i)]+\theta_i\}.$$

BRIEF DESCRIPTION OF THE DRAWINGS

For a more complete understanding of the present invention, and the advantages thereof, reference is now made to the following descriptions taken in conjunction with the accompanying drawings, in which:

FIG. 9 is a set of curves showing a DMD optimized for Littrow blazed operation using the methods of the present invention. In this case, the device requires a 13.8 µm pixel pitch and 9.14-degree tilt angle device, which is well within the fabrication capability of these MEMS devices. This illustrates that for the Littrow condition and 1550 nm wavelength light and a 9.14-degree tilt angle, the center of the Fraunhofer envelope is aligned with the $2^{nd}$ diffraction order, thereby assuring the existence of a blazed condition

FIG. 11 is a set of curves for a typical DMD having a 17 µm pixel pitch, with a 10-degree tilt angle, which is typically used in projection display applications where white light is modulated and reflected off the surface. This illustrates that for the Littrow condition, the center of the Fraunhofer envelope falls between the $2^{nd}$ and $3^{rd}$ diffraction orders, indicating that the light will be shared between orders and therefore will not present a blazed condition.

DETAILED DESCRIPTION OF THE PREFERRED EMBODIMENTS

Figure 1:
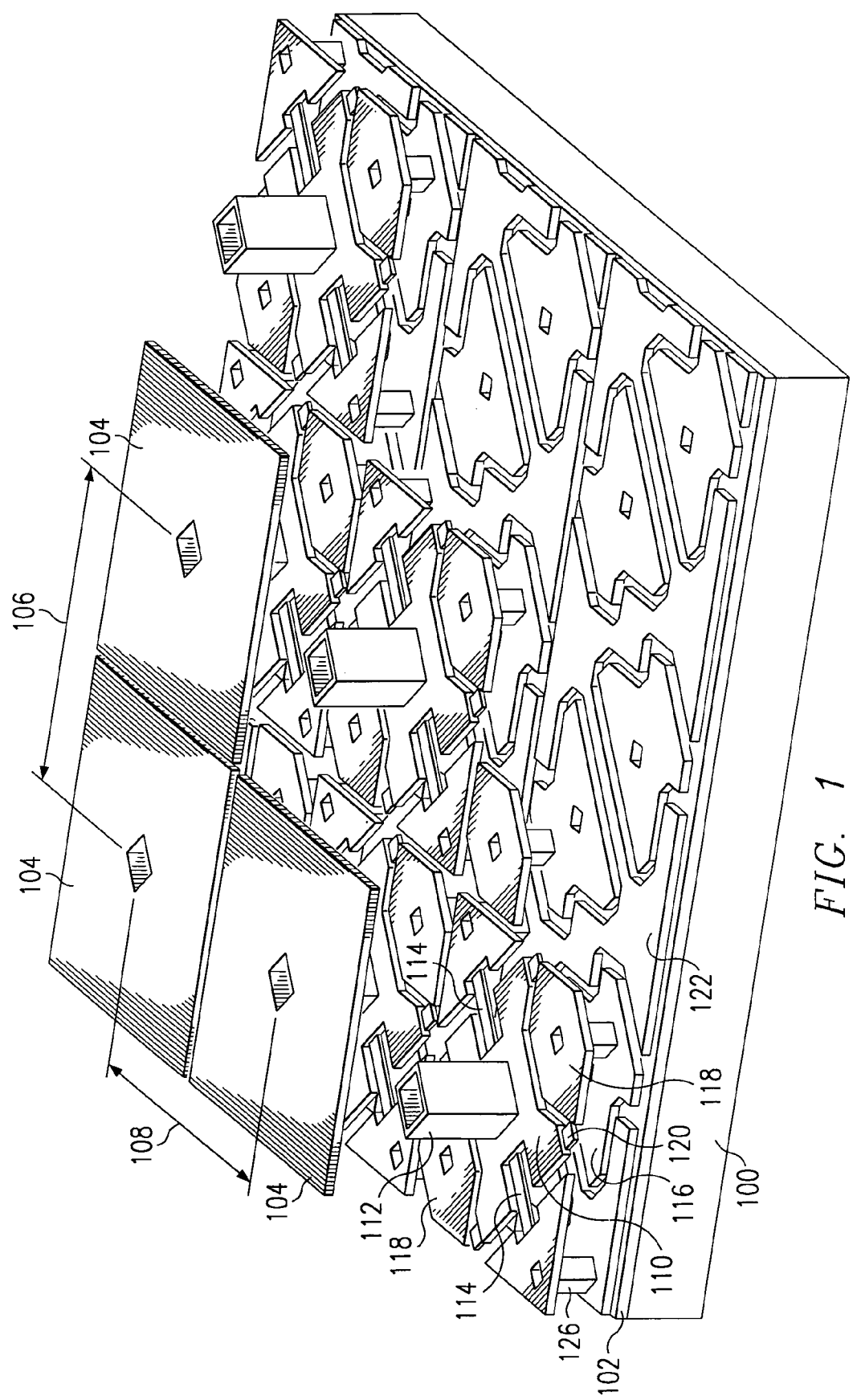
FIG. 1 is a perspective view of a DMD device, showing several micromirrors, illustrating the mirror pitch and tilt mechanism, which can be controlled to provide a blazed operating condition.

The use of MEMS devices, such as the DMD, in optical switching applications is complicated by diffraction effects. To use a typical DMD device, intended for use in a projection display application, in a near monochromatic spatially coherent switching application, may be extremely inefficient. This is because the near monochromatic spatially coherent light from a laser or optical amplifier, when reflected from the DMD, will likely be shared among several diffraction orders rather than being concentrated in a blazed condition as a single bright spot of light. For this reason, DMDs have not found a wide use in fiber optic/telecommunication applications. Fiber optic telecommunication networks can deploy single wavelength, coarsely populated multiple wavelength or densely populated multiple wavelength sources. For example, in wavelength division multiplexing (WDM) optical networking systems, the light being switched is made up of a number of single wavelength laser or amplified optical sources that fall in a relatively narrow band of wavelengths. Hence, we refer in this invention to these types of sources as near monochromatic spatially coherent even thought they might be comprised of multiple specific wavelengths in the band. Also the sources must couple into and out of optical fibers, hence require a degree of spatial coherence appropriate for efficient coupling. Of particular interest is the spectrum used in optical communications, in particular the range from 1480 nm to 1580 nm, including the S (1480-1520 nm), C (1525-1560 nm) and L (1560-1580 nm) bands.

DMDs typically used in projection displays have 17 μm mirrors that tilt 10 degrees in the positive and negative direction. When these devices have been tried in fiber optic telecommunications switching applications, the reflected signal off the mirrors has returned with too great a loss to be usable. For example, at 1550 nm wavelength, a 17×17 μm pixel with 10-degree tilt angle returns a signal that is divided among four diffraction orders, each of which is too small for practical use.

What is needed is a DMD that can operate in a blazed condition, such that it reflects a single, bright spot of light with a large signal amplitude, thereby making it usable in telecommunication switching applications. The method of the present invention meets this need by disclosing a method for determining the mirror pitch and tilt angle to ensure a blazed condition exists for a given near monochromatic spatially coherent light wavelength and incident angle. The device disclosed meets the blaze condition for a two-dimensional DMD grating, making it useful in a number of fiber optic, telecommunications applications.

The present invention discloses a system and method for satisfying the conditions for a blazed operation of a DMD device. By determining the optimal pixel pitch, determined by mirror size, and mirror tilt angle for a given incident angle and wavelength of near monochromatic spatially coherent light, the device can be operated in the blazed condition. By providing a method for meeting the requirements for a blazed condition, the DMD becomes very attractive for use in telecommunications switching applications.

FIG. 1 is a perspective view of a DMD device, showing several micromirrors, illustrating the mirror pitch and tilt mechanism, which is optimized using the method of the present invention to provide a blazed operating condition. The device is fabricated on a silicon substrate 100, which has a digital memory structure. A thick oxide layer 102 is deposited on top of the memory structure and planarized to insolate the upper metal micromirror superstructure from the lower memory structure. The upper superstructure consists of an array of highly reflective metal micromirrors 104 having a pixel pitch of x 106 and y 108, respectively. These micromirrors are attached by means of mirror posts 112 to underlying yokes 110 that rotate on diagonal (45-degrees) torsion hinges 114 in a positive and negative direction depending on the binary state of a memory cell below a mirror. The mirrors are caused to rotate by electrostatic forces established by electric fields between the yoke 110 and yoke address pads 116 and between the mirror 104 and mirror address pads 118. The mirrors tilt in the positive or negative direction until the yoke tips 120 come in physical contact with landing pads 122.

The micromirrors 104 are typically 17 μm in size with less than a 1 μm gap between them and rotate approximately 10 degrees. By controlling the mirror pitch 106/108 and the tilt angle, a DMD can be made to operate in a blazed condition when used with near monochromatic spatially coherent light of a given wavelength and incident angle.

Figure 2:
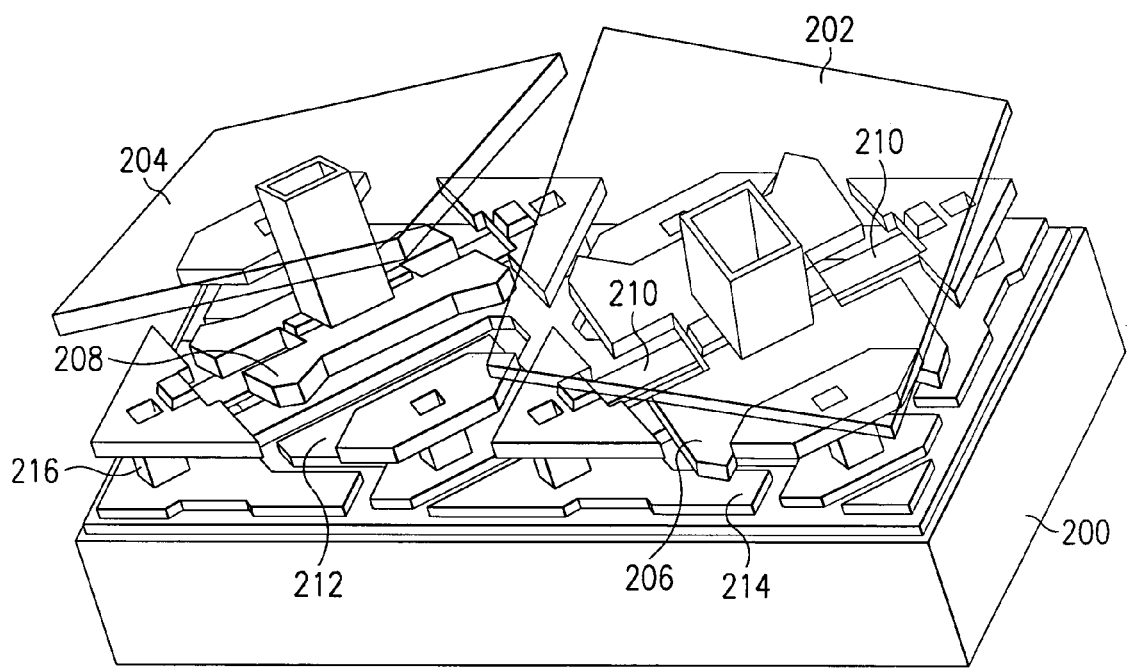
FIG. 2 is a perspective view of two DMD pixels further illustrating the tilting (rotational) structure of the micromirrors.

FIG. 2 is an perspective view of two DMD micromirrors fabricated on a substrate, having a binary memory structure, further illustrating the tilting (rotational) structure of mirrors. This shows the micromirrors 202, 204 supported on yoke 208, which is suspended above a layer forming lower address pads 212 and landing pads 214. The yoke 208 is attached to hinge post 216 by means of torsion hinges 210 that allow the yoke/mirror assembly to rotate in the positive or negative direction until the yoke tip 206 contacts the landing pad 214 on the lower level.

Figure 3:
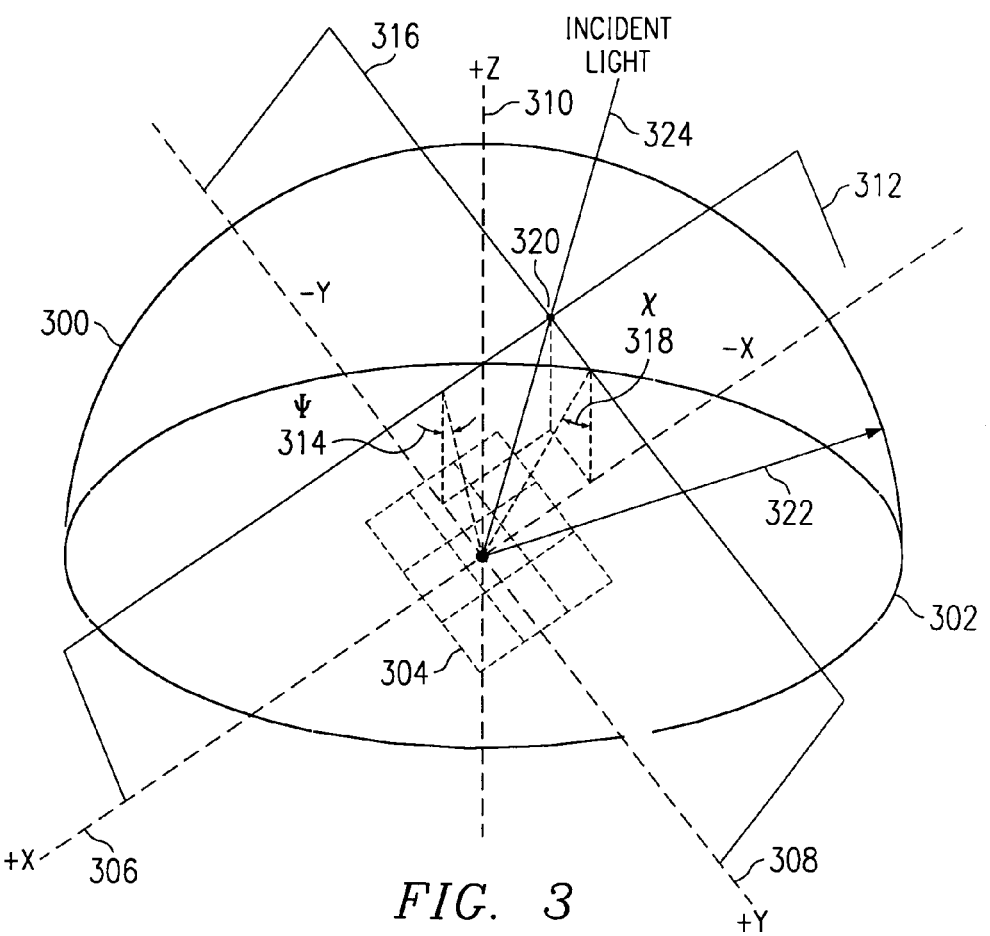
FIG. 3 is a perspective view of a non-orthogonal coordinate system used in determining the mirror size and tilt angle needed to assure a blazed operating condition in a DMD, and how an operating point in this coordinate system is translated to an orthogonal x-y-z operating system.

FIG. 3 is a perspective view of a non-orthogonal coordinate system, positioned over a DMD array 304, used in determining the mirror size and tilt angle needed to assure a blazed operating condition, along with the conversion to an orthogonal x-y-z coordinate system. This shows a hemisphere 300 having a base circle 302. The x-axis 306 and y-axis 308 are in the plane of the base 302 and the z-axis 310 is perpendicular to the base 302. The hemisphere has a unit radius 322 of 1.0 and defines the path for the center of the Fraunhofer envelope, to be discussed later. A first plane 312, which rotates (angle $\Psi$ 314) about the x-axis 306, and a second plane 316, which rotates (angle $\chi$ 318) about the y-axis 308, is shown intersecting at a point 320 on the surface of the hemisphere. The incident light 324 also passes through this point on to the surface of the DMD 304. The point where these two planes intersect 320 with the surface of the hemisphere 300 represents the operating point for the system and can be translated to the x-y coordinate system in the plane of the base 302 as $x = \sin(\chi)$, and $y = \sin(\Psi)$.

Figure 4:
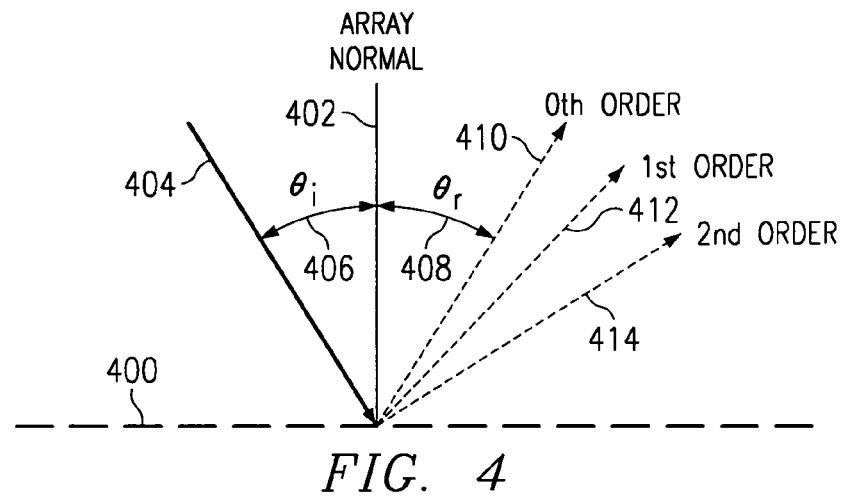
FIG. 4 is a diagram showing the incident light and diffraction orders for a DMD.

FIG. 4 is a diagram showing the DMD represented as a specular array, with the incident light being reflected off the surface of the DMD 400, and the relative location of the diffraction orders. The incident light 404, comes in at an angle $\theta_i$ 406 relative to the DMD array normal 402. The $0^{th}$ diffraction order 410 is shown for light reflected off the DMD at an angle $\theta_r$ 408, which is also measured relative to the array normal and is equal and opposite to the incident angle $\theta_i$ 406. Also shown are the $1^{st}$ 412 and $2^{nd}$ 414 diffraction orders for reflected light. These angles are all relative to flat mirrors 400 in the DMD array.

Figure 5:
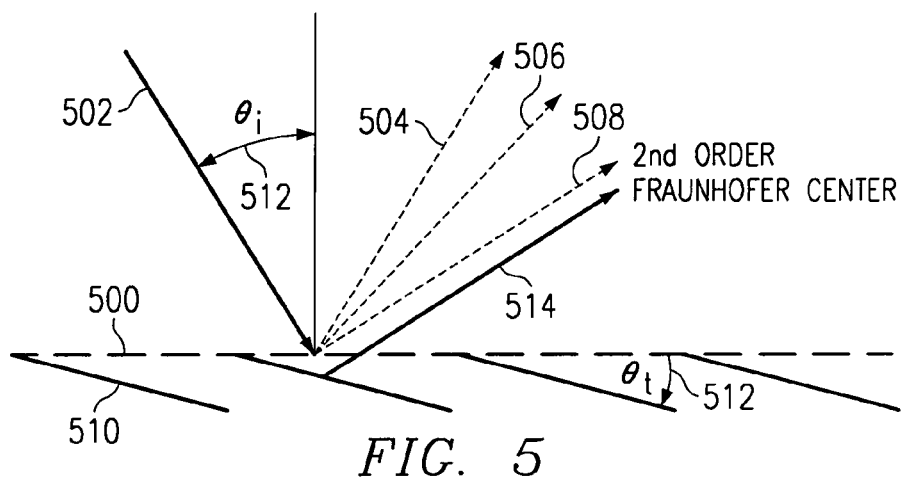
FIG. 5 is a diagram showing the center of the Fraunhofer envelope aligned with the $2^{nd}$ diffraction order, thereby providing a blazed operating condition.

FIG. 5 shows the generalized blaze conditions for a DMD. This shows the incident light 502 at angle $\theta_i$ 512 and the $0^{th}$ 504, $1^{st}$ 506, and $2^{nd}$ 508 diffraction orders relative to the flat surface of the DMD 500, as described earlier in FIG. 4. In this case, the individual DMD mirrors 510 are tilted by an angle $\theta_t$ 512. This tilt angle $\theta_t$ 512 is such that the center of the Fraunhofer envelope 514 for the reflected light aligns with a diffraction order; e.g., the $2^{nd}$ order 508 in this case, thereby establishing a blaze condition.

The Fraunhofer envelope determines the amount of energy reflected off the DMD surface into the available orders. It is given as the Fourier transform, $\Im$, of the aperture function, G, for a pixel (mirror) of the DMD. The available orders are determined by the Fourier transform of the array of delta functions representing the array. In the Fourier space, which is the diffraction 'sine' space, the two parts are separable as a result of the properties for a Fourier transform of a convolution of two functions. Together these can be written as:

$\Im(F*G)$ which is equivalent to the product $\Im(F*G) = \Im(F) \cdot \Im(G)$.

Critical to the method of the present invention is the requirement that if the center of the Fraunhofer envelope is aligned, as shown in FIG. 5, with a diffraction order, then the system will be blazed and a bright spot of near monochromatic spatially coherent light will be reflected by the DMD. Otherwise, the energy will be shared among two or more diffraction orders, raising the background of the signal and creating multiple faint images, which are not usable in commercially practical near monochromatic spatially coherent switching applications.

Figure 6:
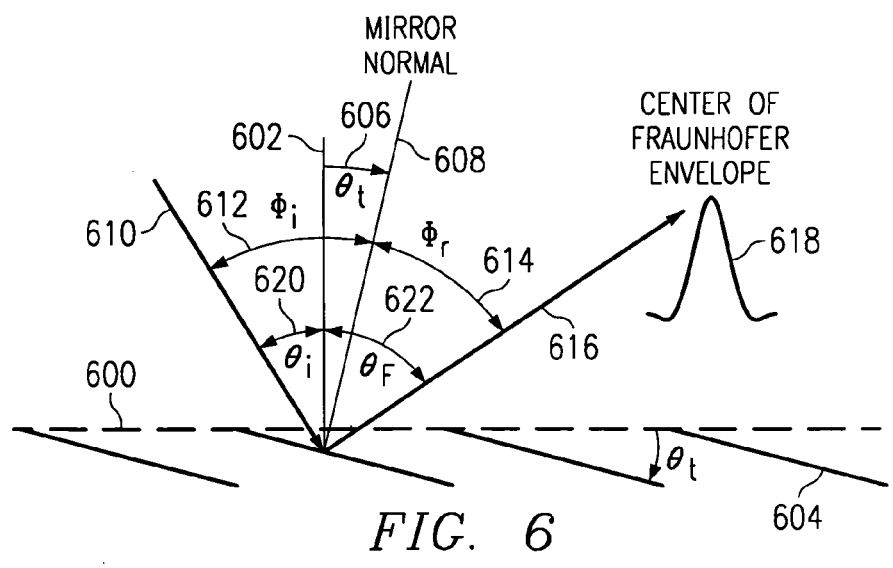
FIG. 6 is a diagram showing the effect of tilting the individual micromirrors and aligning the Fraunhofer envelope center with a diffraction order, and the relationship between various angles relative to the array normal and the mirror normal.

FIG. 6 is a diagram illustrating specular reflection for a blazed condition, with the Fraunhofer envelope centered on a diffraction order. In this case the micromirrors 604 are tilted by an angle $\theta_t$ 606, so that now there is both an array normal 602, relative to flat mirrors 600, and a mirror normal 608, relative to tilted mirrors. As discussed earlier, the incident light 610 enters the system at an angle $\theta_i$ 620 relative to the array normal 602, but at an angle $\phi_i$ 612 relative to the mirror normal 608, so that $$\phi_i = \theta_i + \theta_t.$$

The Fraunhofer envelope 618 is shown aligned with a diffraction order 616 to assure a blazed condition. The reflected light measured relative to the mirror normal is shown as $\phi_r$ 614, and the center of the Fraunhofer envelope measured relative to the array normal 602 is shown as $\theta_F$ 622, where $$\theta_F = -\theta_i + 2\theta_t.$$

Again, if the center of the Fraunhofer envelope is aligned with a diffraction order, a blazed condition exists and at least 88% of the near monochromatic spatially coherent light is reflected by the DMD as a single bright spot. One aspect of the present invention is how to assure that this condition, that the Fraunhofer envelope center aligns with a diffraction order, exists. This condition can be met by determining the correct pixel (mirror) pitch and tilt angle using the following procedure:

For a given near monochromatic spatially coherent light at a given incident angle, $\theta_i$, determines the angle for the $n^{th}$ diffraction order of the light as:

$\sin(\theta_n) = \sin(-\theta_i) + n\lambda/d$, where $\theta_n$ is the angle of the $n^{th}$ diffraction order,
n is the diffraction order,
$\lambda$ is the wavelength of said incident light, and
d is the pixel grating pitch of said DMD;

then satisfy the blaze condition that:

$\sin(\theta_n) = \sin(\theta_F)$, where $\theta_F$ is the angle for the center of the Fraunhofer envelope, to align the center of the Fraunhofer envelope center with diffraction order n, and further that $\theta_F = -\theta_i + 2\theta_t$, where $\theta_t$ is the tilt angle of the individual DMD mirrors;

thereby giving the relationship to meet the blazed condition:

$$\theta_t(\theta_i, n) = \frac{1}{2}\{\arcsin[(n\lambda/d)\sqrt{2} - \sin(\theta_i)] + \theta_i\}. \quad (1)$$

The $\sqrt{2}$ term appears since a two dimensional diffraction pattern is involved, due to the DMD mirrors tilting around a 45-degree axis, so that the diffraction orders of interest are those in which m=n for the two dimensions. In this discussion, the nth order refers to the general case of the (n, n) order. When these conditions are met, the system is blazed. It is only necessary to determine a mirror pitch and tilt angle for a given incident light and wavelength that is practical as far as DMD fabrication is concerned.

For the case of flat mirrors, the position of the Fraunhofer envelope will always be the same as the $0^{th}$ diffraction order and the $0^{th}$ order will be blazed.

Figure 7:
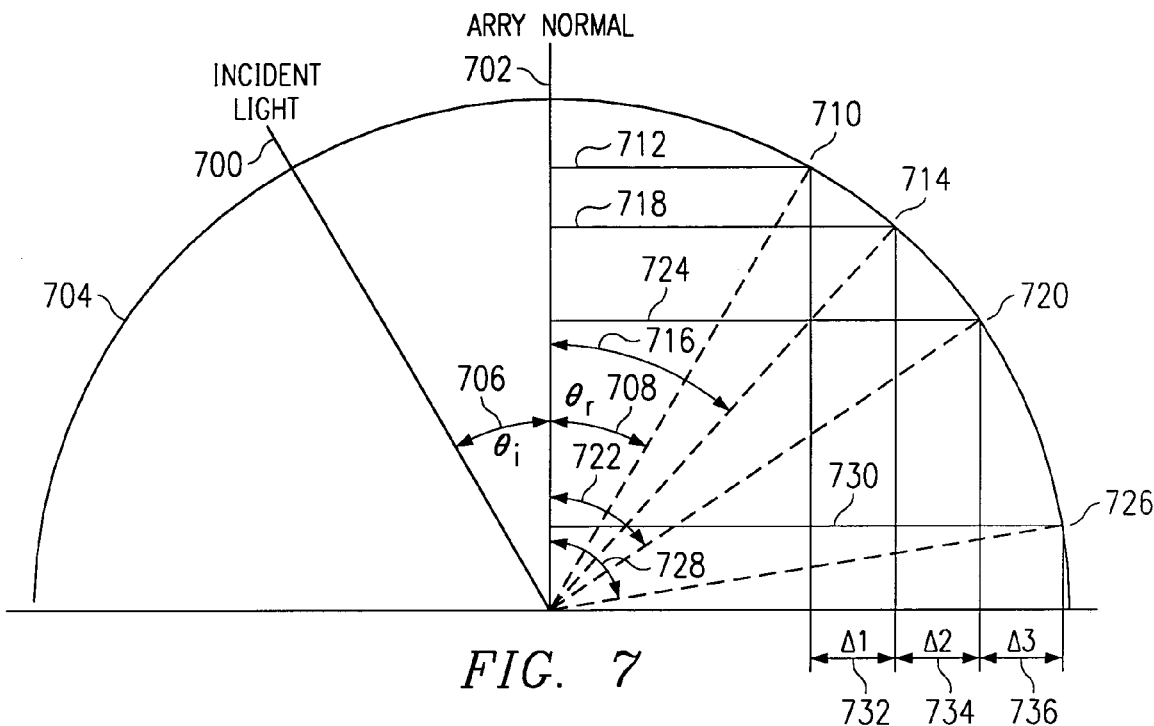
FIG. 7 is a diagram showing the Fraunhofer envelope and center path, along with the diffraction orders. Of particular interest is that the difference of the sine of the diffraction order angles is projected as equal $\Delta s$ along the x-axis.

FIG. 7 is a diagram showing the Fraunhofer envelope (semicircle of radius=1) 704 center path, along with the diffraction orders. This shows a one dimensional example of how the angle of one of the planes in FIG. 3 translates to the x or y axis in the base plane. The incident light enters the system at angle $\theta_i$ 706. Line 702 represents the normal to the DMD array (the z-axis). The $0^{th}$ diffraction order 710 is shown at an angle $\theta_r$ 708 relative to the array normal, which is equal and opposite to $\theta_i$. Also shown are the positions for the $1^{st}$ 714, $2^{nd}$ 720, and $3^{rd}$ 726 diffraction orders, respectively. The position of these diffraction orders translated on to the x-axis is given as:

x=sin($\chi$)1, where the 1 is the unit radius of the semicircle,
the orders being located along the x-axis at:
$0^{th}$ order, x 712=sin($\theta_r$ 708),
$1^{st}$ order, x 718=sin($\chi_1$ 716),
$2^{nd}$ order, x 724=sin($\chi_1$ 722),
$3^{rd}$ order, x 730=sin($\chi_1$ 728).

Of particular interest in this figure is the fact that the difference of the sine of the diffraction order angles is projected as equal $\Delta$s along the x-axis:

$$\Delta_1 = x718 - x712,$$

$$\Delta_2 = x724 - x718,$$

$$\Delta_3 = x730 - x724, \text{ and}$$

$$\Delta_1 = \Delta_2 = \Delta_3.$$

A special case, known as the Littrow condition, exists where the reflected light transverses the same path as the incident light. Similar to the earlier case, if the Fraunhofer envelope center is aligned with a diffraction order, a Littrow blazed condition can be achieved. This condition is particularly useful in switching applications since the same optics can be used for incoming and reflected (outgoing) light. The special requirements for Littrow blaze conditions are:

$\phi_i = \phi_r = 0$,
$\theta_i = \theta_r$, and
$\phi_i$ is that of a diffraction order, so that equation (1) reduces to:

$\theta_t(n) = \arcsin[(\lambda/d \cdot n/\sqrt{2}) - \arcsin(\sin\theta_i)/2 + \theta_i/2]$, $\theta_t(n) = \arcsin[(\lambda/dn/\sqrt{2}) - \theta_i/2 + \theta_i/2]$, and $$\theta_t(n) = \arcsin[(\lambda/dn/\sqrt{2})]. \quad (2)$$

This condition offers the widest range of angles that remain at or near a blazed condition.

Figure 8:
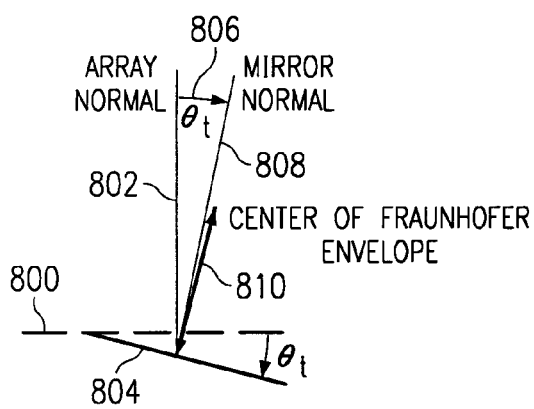
FIG. 8 is a diagram illustrating the case for the special Littrow condition, where the incident and reflected light lie along the same path.

FIG. 8 illustrates the case for the special Littrow blaze condition, where the incident light 808 and reflected light 810 are on the same path, which is aligned with a diffraction order. The center of the Fraunhofer envelope is also aligned with this diffraction order. In this case, the mirrors 804 are tilted by angle $\theta_t$ 806 relative to the array normal 802 and/or the array surface 800.

FIG. 9 is a set of curves showing a DMD optimized for Littrow blazed condition using the methods of the present invention. This family of curves is for mirrors that tilt along a 45° line, which is the case for the DMD where the mirrors rotate on a diagonal axis. From equation (2) and the chart, it is seen the device requires a 13.8 µm pixel pitch and 9.14-degree tilt angle for 1550 nm wavelength light and a 9.14-degree incident angle to achieve a blazed condition where the center of the Fraunhofer envelope is aligned with the $2^{nd}$ diffraction order. This pixel pitch and tilt angle is well within the fabrication capability of these MEMS devices. As shown, the chart 900 has a set of diffraction order curves 902 for positive tilt angles and a set 904 for negative tilt angles. The intersection of the dotted line 906 and curves define the Littrow blaze conditions for different values of n. As shown, for this 1550 nm wavelength light source and a 9.14-degree incident angle, a 13.8 µm mirror pitch and 9.14-degree tilt angle will properly align the center of the Fraunhofer envelope with the $2^{nd}$ diffraction order at point 908, thereby assuring a Littrow blazed condition.

Figure 10:
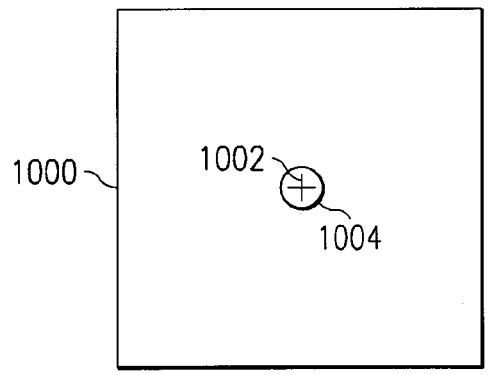
FIG. 10 is an image showing the results for the blazed condition of FIG. 9. Here, a single bright, centered image is present, making it effective for use in telecommunications switching applications.

FIG. 10 is an image showing the results for the optimized Littrow blazed condition of FIG. 9. Here, a single bright image 1004 is present, centered 1002 in the field-of-view 1000, thereby making it effective for use in telecommunications switching applications.

For comparison purposes, FIG. 11 shows a set of curves for a typical 17 µm pixel pitch and 10-degree tilt angle DMD, like that used in projection display applications where white light is modulated and reflected off the mirror surfaces. As in the earlier example, the chart 1100 has a set of diffraction order curves 1102 for positive tilt angles and a set 1104 for negative tilt angles. The dotted line 1106 defines the special Littrow condition. This shows that for a typical projection display DMD having 17 µm mirror pitch, 10-degree tilt angle, when used with 10-degree incident near monochromatic spatially coherent light having a 1550 nm wavelength, the center of the Fraunhofer envelope is centered between the $2^{nd}$ and $3^{rd}$ diffraction orders. As a result, the light is shared among several orders, making it inefficient for use in telecommunications switching applications.

Figure 12:
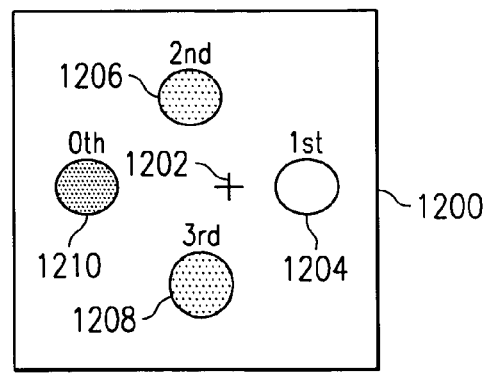
FIG. 12 is an image showing the results for the off-blaze condition of FIG. 11. The result is four rather faint images spread over four diffraction orders, with the $3^{rd}$ order being the brightest, although unusable. This illustrates why these non-blazed MEMS devices have not found wide usage in near monochromatic spatially coherent switching application to date.

FIG. 12 is an image showing the results for the off-blaze condition of FIG. 11. The result is four rather faint images spread over four diffraction orders 1204-1210, with the $3^{rd}$ (3,3) order 1204 being the brightest, although unusable in near monochromatic spatially coherent switching applications. Also the images are not centered 1202 in the field-of-view 1200. This illustrates why these type MEMS devices have not found wide use in near monochromatic spatially coherent switching applications in the past. The method of the present invention will change this, making the DMD MEMS device a highly effective device for switching near monochromatic spatially coherent light.

Figure 13:
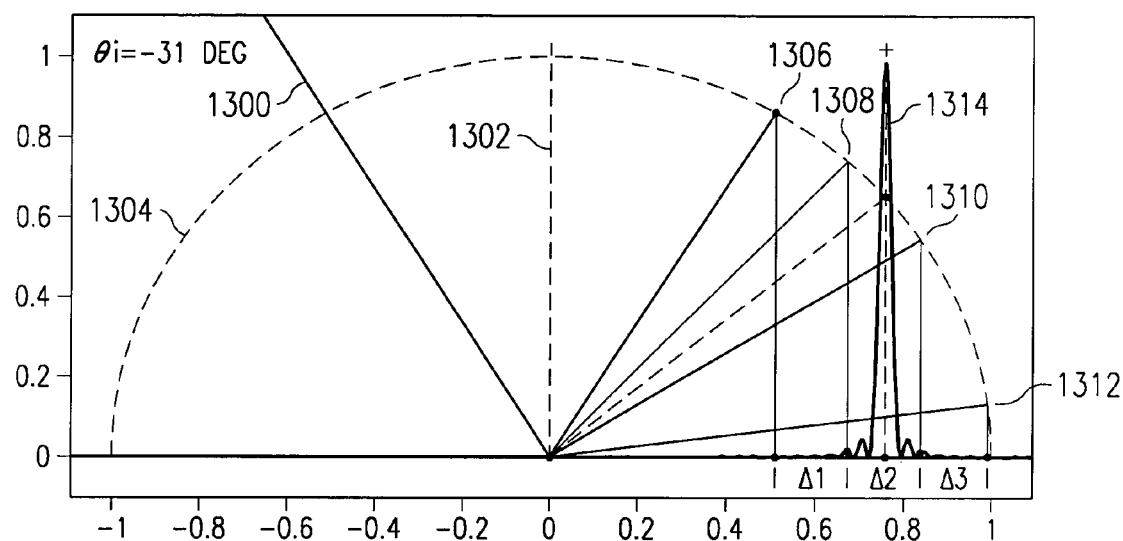
FIG. 13 is a diagram showing an off-blaze condition, where the Fraunhofer envelope curve is centered between the $2^{nd}$ and $3^{rd}$ diffraction orders, thereby sharing the light distribution among multiple orders.

FIG. 13 is a diagram like that discussed in FIG. 7, showing the case for an off-blaze condition, where the Fraunhofer envelope curve is centered between the $1^{st}$ and $2^{nd}$ diffraction orders, thereby spreading the light distribution across multiple orders. The incident light 1300 is shown coming in at an angle of −31°, relative to the array normal 1302. The semicircle line 1304 represents the path for the center of the Fraunhofer envelope. The $0^{th}$ diffraction order 1306 is shown at an equal and opposite angle from the incident light 1300 and intersecting the Fraunhofer envelope path. Also shown are the $1^{st}$ 1308, $2^{nd}$ 1310, and $3^{rd}$ 1312 diffraction orders. Notice that when these orders, generated at different angles, are translated to the x-axis as sin ($\chi$), they create equal $\Delta$s ($\Delta 1$-$\Delta 3$) along the axis, as discussed earlier in FIG. 5. In this example, the Fraunhofer envelope 1314 is centered between the $1^{st}$ and $2^{nd}$ diffraction orders, presenting an off-blaze condition (as described in FIG. 12) where the light is spread over several diffraction orders. The Fraunhofer envelope represents the available light and it must be centered (or near center) on a diffraction order to achieve a blazed condition and be effective in near monochromatic spatially coherent light switching applications. In this example, the MEMS device would work fine with white light in a projection display application, but would be virtually useless in a telecommunications application where a laser beam is switched between fiber optics.

Figure 14:
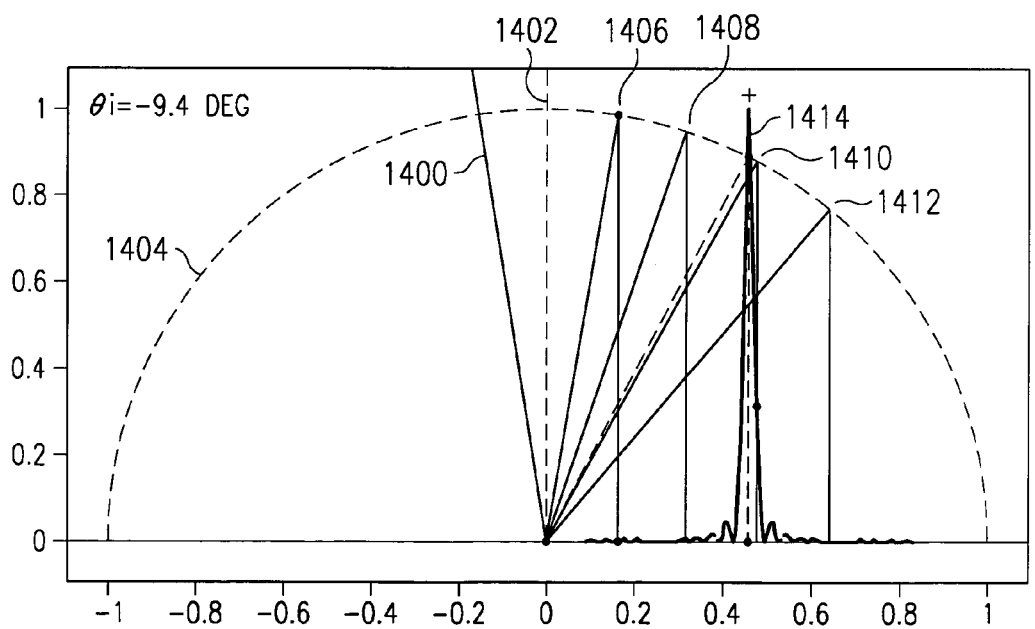
FIG. 14 is a diagram showing the conditions for a near-blaze condition, where the Fraunhofer envelope distribution curve is centered very close to the $2^{nd}$ diffraction order, which is usable in near monochromatic spatially coherent light switching applications.

FIG. 14 shows the same type diagram as FIG. 13, but for a near-blazed condition, where the Fraunhofer envelope curve center almost lines up with the $2^{nd}$ diffraction order, thereby providing a bright spot of reflected light as described earlier in FIG. 10. In this case, the incident light 1400 is shown coming in at an angle of −9.4° relative to the array normal 1402. Again, the semicircle line 1404 represents the path for the center of the Fraunhofer envelope. The $0^{th}$ diffraction order 1406 is shown at an equal and opposite angle from the incident light 1400. Also shown are the $1^{st}$ 1408, $2^{nd}$ 1410, and $3^{rd}$ 1412 diffraction orders. In this example, the center of the Fraunhofer envelope 1414 lies almost on top of the $2^{nd}$ diffraction orders, presenting a near-blaze condition, where approximately 88% of the available light is reflected from the DMD as a single bright spot.

Figure 15:
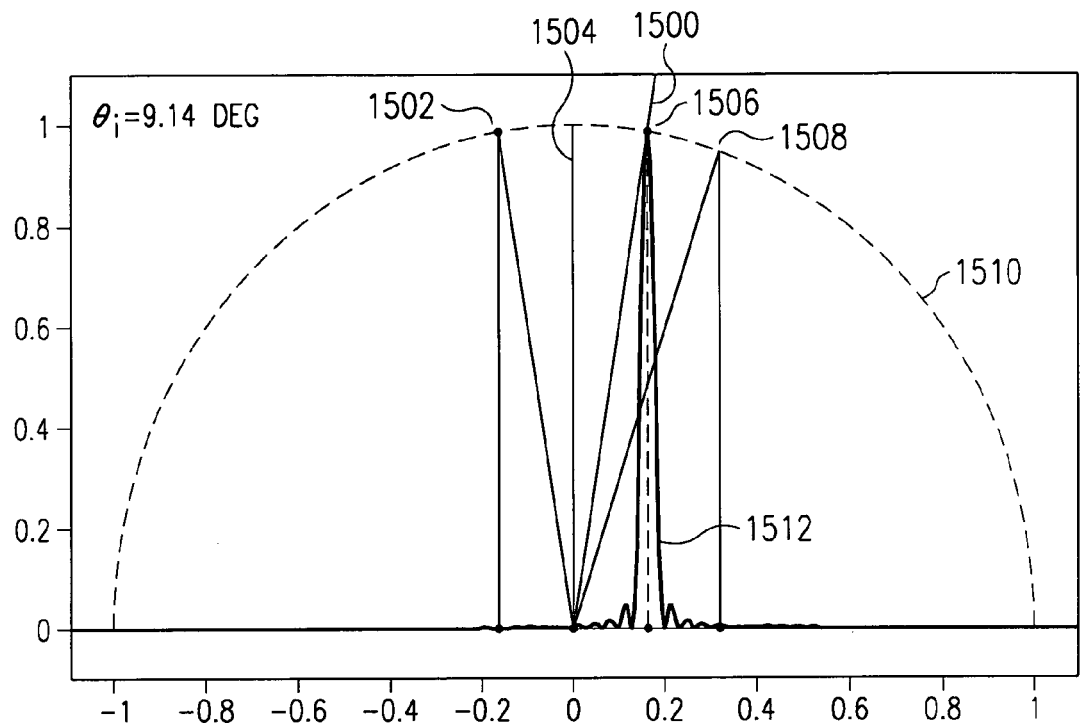
FIG. 15 is a diagram showing the conditions for a Littrow $2^{nd}$ order-blazed condition, where the incident light and Fraunhofer envelope center are precisely aligned with the $2^{nd}$ diffraction order.

FIG. 15 is the same diagram showing the Littrow blazed condition. In this case, incident light 1500 is coming in at a +9.14° angle. The $0^{th}$ diffraction order 1502 is shown at an equal and opposite angle to the incident light. The $1^{st}$ 1504, $2^{nd}$ 1506, and $3^{rd}$ 1508 diffraction orders, as well as the Fraunhofer envelope path 15 10, are also shown. For this special Littrow blazed case, the incident light 1500 and the center of the Fraunhofer envelope 1512 are aligned along the $2^{nd}$ diffraction order 1506. This special condition is very useful in fiber optic switching application since the same optics can be used for both incoming and reflected light.

Figure 16:
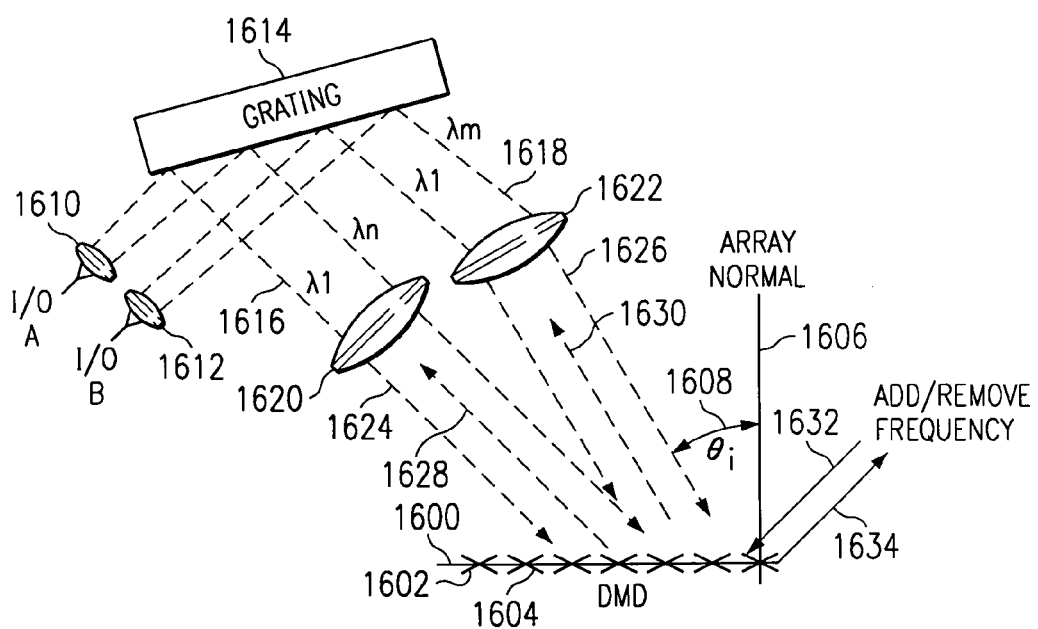
FIG. 16 is a schematic diagram for a first near monochromatic spatially coherent application using a DMD operated in a near-blazed Littrow condition, which is optimized using the techniques of the present invention, as a wave division multiplexer (WDM).

FIG. 16 is a schematic diagram for a first near monochromatic spatially coherent application using a DMD operated in a near-blazed Littrow condition, which is optimized using the techniques of the present invention, as a wave division multiplexer (WDM). This application can be used for reconfigurable multiplexing of wavelength channels, where any subset of wavelengths can be added to or dropped from the signal. This shows two input/outputs (I/O), A and B, applied to input optics 1610, 1612, respectively, and then coupled to an optical grating 1614. The grating provides collimated light beams 1616, 1618 with frequency components varying from $\lambda 1$ to $\lambda n$ and $\lambda 1$ to $\lambda m$, respectively, coupled to condensing optics 1620, 1622. The dual incident light beams are then directed on to the surface of a DMD, whose mirror pitch and tilt angle have been optimized for operation in the Littrow near-blazed condition for the incident angle, $\theta_i$ 1608, and wavelength of the near monochromatic spatially coherent light. The surface of the DMD, equivalent to flat mirrors 1600, and the array normal 1606 are also shown. The DMD mirrors are capable of being tilted in either the positive 1602 or negative 1604 direction, as indicated. For mirrors tilted in the positive direction 1602, light is reflected directly back into the optics 1628,1630 in a Littrow blaze condition, as described in FIG. 15 where both the incident light and the Fraunhofer envelope center is aligned with the same diffraction order. Mirrors tilted in the negative direction 1604 reflect light 1634 out of the aperture of the optics and can be used to add additional light 1632 into the optical path.

In operation, this near-blazed Littrow DMD switching system can be used to interchange the light from the two I/Os, to remove various frequency components ($\lambda_n, \lambda_m$) from the light beams, or to add additional frequency components to the light beams. In this dual beam application it may be difficult to precisely align the Fraunhofer centers of both beams with a diffraction order, but they can at least be aligned for near-blazed operation, as shown in FIG. 14.

Figure 17A:
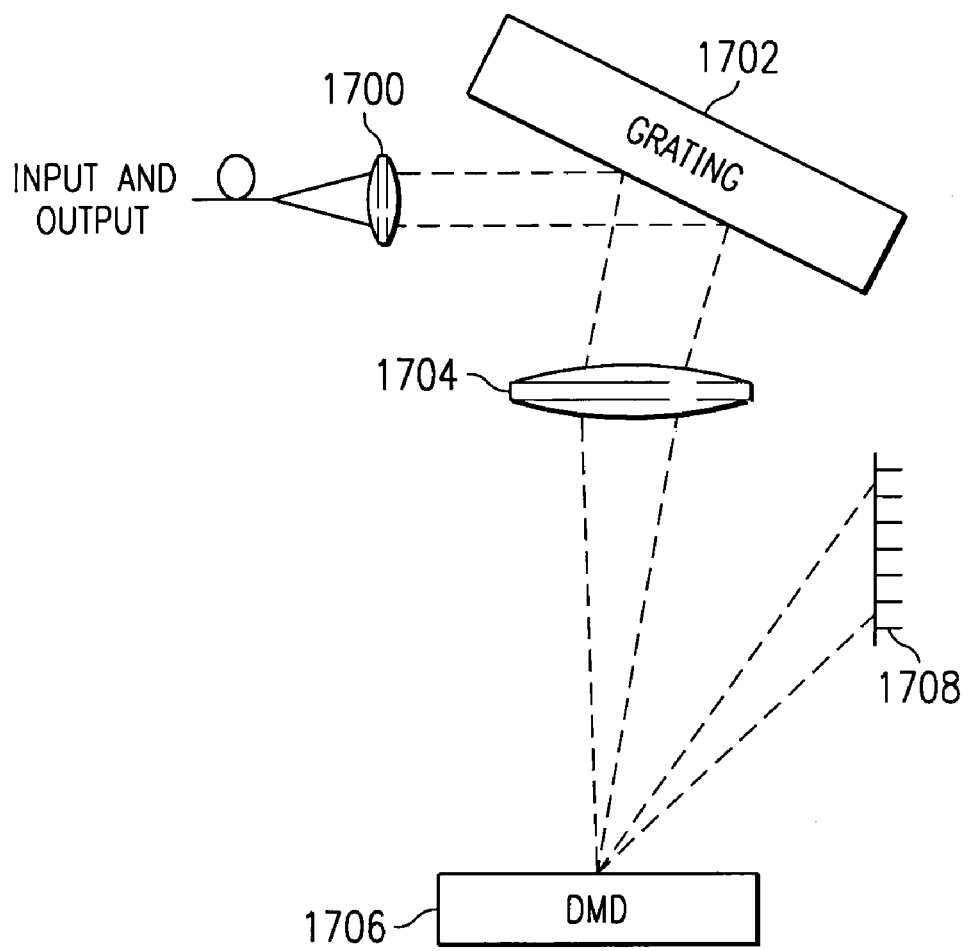
FIG. 17*a* is a schematic diagram for a second near monochromatic spatially coherent application using a DMD operating in a blazed Littrow condition, which is optimized using the techniques of the present invention, as a variable optical attenuator.
Figure 17B:
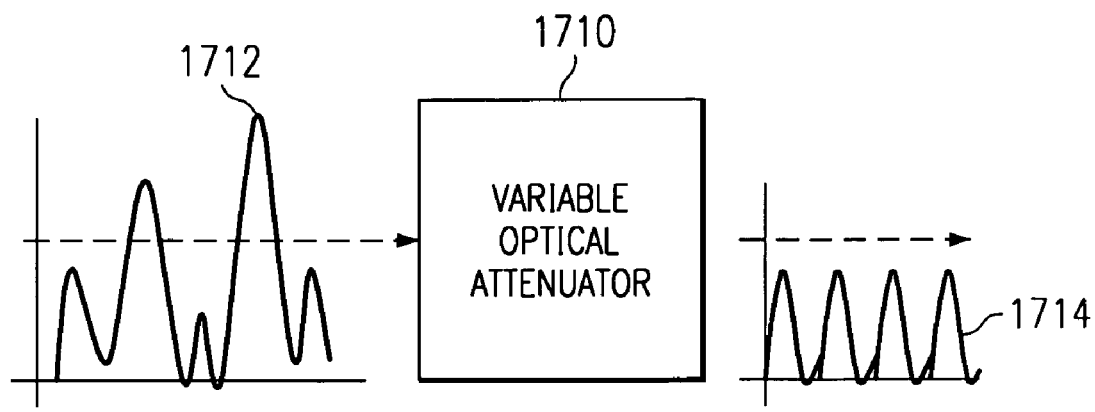
FIG. 17*b* shows the results of attenuating the input signal using the system of FIG. 17*a*, thereby providing an output of constant amplitude.

FIG. 17*a* is a schematic diagram for a second near monochromatic spatially coherent application using a DMD operating in a Littrow blazed condition as a variable optical attenuator, which is optimized using the techniques of the present invention, as a variable optical attenuator. This application uses the DMD mirrors to attenuate the signal channel by channel, as illustrated in FIG. 17b, where the input signal 1712 is passed through the DMD variable optical attenuator 1710 to provide a constant amplitude output signal 1714. The system is comprised of input optics 1700, coupled to an optical grating 1702 where the light is collimated into various wavelength components and then passed through condensing optics 1704 onto the surface of a DMD 1706, optimized for Littrow blaze operation. The attenuated light is then reflected back into the optics along the same path as that for the incoming light. Also, unwanted channels of light can be removed from the system and discarded by a light dump 1708.

Thus, although there has been disclosed to this point a particular embodiment for a blazed MEMs device and method therefore, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims. In the following claims, only elements denoted by the words "means for" are intended to be interpreted as means plus function claims under 35 U.S.C. § 112, paragraph six.

What is claimed is:

1. A micromirror device comprising:
   a two-dimensional array of deflectable mirrors, said array having at least two rows comprised of at least two columns with a pitch distance (d) between adjacent mirrors;
   a yoke supporting each said mirror, said yoke operable to establish a tilt angle for its corresponding mirror, said tilt angle established by contact between said yoke and another component of said micromirror device; and
   wherein said micromirror device is blazed for near monochromatic spatially coherent light having a wavelength in the range of 1480-1580 nm.

2. The micromirror device of claim 1, wherein said micromirror device is blazed in the Littrow condition for near monochromatic spatially coherent light having a wavelength in the range of 1480-1580 nm.

3. The micromirror device of claim 1, said tilt angle established by contact between said yoke and a substrate of said micromirror device.

4. The micromirror device of claim 1, said tilt angle established by contact between said yoke and a landing pad of said micromirror device.

5. A system for fiber optic/telecommunication switching/modulating applications, comprising:
   an optical grating;
   one or more near monochromatic spatially coherent light input signals coupled to said optical grating, said optical grating converting said light into collimated channels of varying frequency, said collimated light being passed through condensing optics on to the surface of a micromirror device;
   said micromirror device comprising:
      a two-dimensional array of deflectable mirrors, said array having at least two rows comprised of at least two columns with a pitch distance (d) between adjacent mirrors; and
      a yoke supporting each said mirror, said yoke operable to establish a tilt angle for its corresponding mirror, said tilt angle established by contact between said yoke and another component of said micromirror device; and
   wherein said micromirror device is blazed for near monochromatic spatially coherent light having a wavelength in the range of 1480-1580 nm.

6. The system of claim 5, said system operable to selectively add or remove frequency channels from said light.

7. The system of claim 5, said system operable to selectively modulate frequency channels from said light.

8. The system of claim 5, said system operable to selectively switch frequency channels from said light.

9. The system of claim 5, said system operable to selectively attenuate frequency channels from said light.

10. The system of claim 5, said tilt angle established by contact between said yoke and another component of said micromirror device.

11. The system of claim 5, said tilt angle established by contact between said yoke and a substrate of said micromirror device.

12. The system of claim 5, said tilt angle established by contact between said yoke and a landing pad of said micromirror device.

* * * * *